United States Patent [19]

Morris

[11] 4,399,095
[45] Aug. 16, 1983

[54] PROTECTION AND CONTROL SYSTEM FOR A NUCLEAR REACTOR

[75] Inventor: Peter J. Morris, Irwin, Pa.

[73] Assignee: Westinghouse Electric Corp., Pittsburgh, Pa.

[21] Appl. No.: 861,131

[22] Filed: Dec. 16, 1977

[51] Int. Cl.³ .............................................. G21C 7/36
[52] U.S. Cl. ...................................... 376/216; 376/215; 376/219
[58] Field of Search ............... 176/19 R, 19 S, 19 EC, 176/20 R, 22, 24, 25; 340/589; 376/216, 215, 219

[56] References Cited

U.S. PATENT DOCUMENTS

| | | | |
|---|---|---|---|
| 2,553,603 | 5/1951 | Peters | 340/589 |
| 3,423,285 | 1/1969 | Curry | 176/24 |
| 3,518,654 | 6/1970 | Vassic | 340/589 |
| 3,752,735 | 8/1973 | Musick | 176/24 |
| 4,016,034 | 4/1977 | Musick | 176/24 |
| 4,075,059 | 2/1978 | Bruno | 176/24 |
| 4,080,251 | 3/1978 | Musick | 176/24 |

Primary Examiner—Donald P. Walsh
Attorney, Agent, or Firm—Daniel C. Abeles

[57] ABSTRACT

A protection and control system for a nuclear reactor which monitors a variable operating parameter indicative of the state of reactor operation and identifies an abnormal rate of change in reactor operating conditions. The operating parameter monitored at a given time after the abnormal change in operating conditions is identified and is employed as a base for a variable setpoint defining a design limit within which the reactor can continue to operate. At a preselected time following the identification of the abnormal rate of change of the reactor operating conditions, control of the reactor is automatically modified to establish a reactor working environment in which the reactor can continue to operate. Should the established setpoint be exceeded, the reactor will automatically be tripped.

In one embodiment the negative rate of change of neutron flux of the nuclear core is monitored and compared to a preselected reference. If the reference is exceeded, following a preestablished time interval the flux monitored within the reactor core will be stored and employed as a base for the setpoint design limit below which reactor operation may continue. At the same time, control rod withdrawal from the core is blocked and load requirements are reduced compatible with the new operating level of the core. Should core power subsequently increase above its flux setpoint limit the reactor will automatically be tripped.

7 Claims, 3 Drawing Figures

PROTECTION AND CONTROL SYSTEM FOR A NUCLEAR REACTOR

BACKGROUND OF THE INVENTION

This invention pertains generally to protection systems for nuclear reactors, and more particularly, to protection systems employing setpoints variably dependent upon the prior core history, to control reactor operation.

Generally, nuclear reactors contain a reactive region commonly referred to as the core in which sustained fission reactions occur to generate heat. The core includes a plurality of elongated fuel rods comprising fissile material, positioned in assemblies and arranged in a prescribed geometry governed by the physics of the nuclear reaction. Neutrons bombarding the fissile material promote the fissionable reaction which in turn releases additional neutrons to maintain a sustained process. The heat generated in the core is carried away by a cooling medium, which circulates among the fuel assemblies and is conveyed to heat exchangers which in turn produce steam which forms the motive force to drive turbine generators for the production of electricity.

Commonly, in pressurized water reactors a neutron absorbing element is included within the cooling medium (which also functions as a moderator) in controlled variable concentrations to modify the reactivity when required, and thus the heat generated within the core. In addition, control rods are dispersed among the fuel assemblies, longitudinally movable axially within the core, to control the core's reactivity, and thus its power output.

While the radial power distribution of the core is fairly uniform under normal operation, due to the prescribed arrangement of fuel assemblies and control rods which are symmetrically situated radially throughout the core, the axial power distribution can vary greatly during reactor operation. Preferably, to obtain maximum efficiency in fuel burnup and retain a maximum power output capability within the core, the axial power distribution is maintained substantially uniform under most operating conditions.

The neutron flux within the core is monitored as a representation of core power, by four axially spaced detectors equidistantly positioned around the periphery of the core, exterior of the reactor. Each detector monitors the flux in the upper and lower half of a corresponding core quadrant and provides corresponding outputs which are employed by the protection and control systems of the reactor. Flux control limits are established to assure that potential axial and radial flux peaks are maintained within acceptable limits.

One of the protection systems offered for pressurized water reactors trips the reactor and ceases the core fission reaction when the flux detectors identify a negative rate of change of flux within the core greater than a preestablished value. Such a negative rate of change of flux can, for example, be indicative of a dropped control rod, which will alter the radial flux symmetry within the core and reduce the overall core power output, and thus the heat generated by the core. Without such protection the programmed average temperature control system employed in a number of nuclear electrical generating facilities would attempt to increase the core power output automatically upon such a reduction in power, to maintain load requirements, without consideration of the radial power symmetry of the core. An example of such a control system is described in U.S. Pat. No. 3,423,285 to C. F. Currey et al. Such an increase in power level without consideration of the core power symmetry and the heat operating power level within the core could raise local core power conditions above acceptable limits. Furthermore, the reduced power output of the core, without a corresponding reduction in load, will reduce the temperature of the reactor. In nuclear systems having a negative temperature coefficient, such as in pressurized water reactors, the lower core temperature will result in an increase in reactivity which can also raise local conditions above desirable limits. However, it is not always necessary to trip a reactor under such conditions if local power peaks can be maintained below design limits.

Accordingly, a new protection and control system is desired that will identify abnormal operating conditions and modify reactor control compatibly with continued, safe operation of the plant.

SUMMARY OF THE INVENTION

This invention overcomes the deficiencies of the prior art by providing a nuclear reactor control system that monitors reactor operation, identifies an abnormal operating condition and automatically takes into account the prior operating history of the core before initiating corrective action. The control system also includes the capability of modifying reactor operation compatibly with continued, safe operation of the plant in the event design operating specifications are exceeded.

In accordance with this invention, the control system monitors a variable operating parameter indicative of the state of operation of the reactor. The monitored parameter is employed to automatically generate a variable setpoint representative of a desired design limit within which the reactor can continue to function upon the occurrence of an unidentified undesirable operating condition. The value of the variable setpoint is dependent upon and will vary in accordance with the prior operating history of the core. In one embodiment, upon identification of an undesirable operating condition, the control system automatically conforms the reactor to an acceptable design operating level. If the variable setpoint is then exceeded, the reactor will be tripped.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

Figure 1:
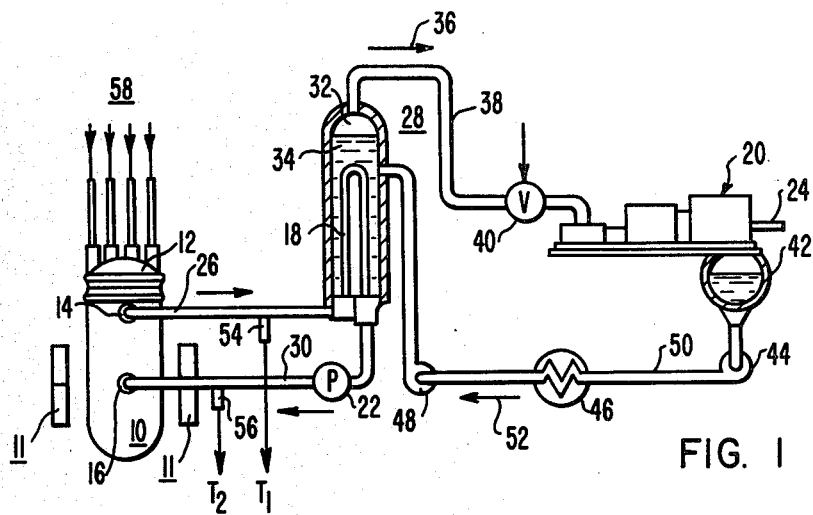
FIG. 1 is a schematic illustration of a nuclear reactor power generating facility.

FIG. 1 shows a schematic representation of a typical pressurized water reactor which can employ the control system of this invention to avoid unnecessary reactor trips in the event of dropped control rods. The reactor of FIG. 1 includes a vessel 10 which forms a pressurized container when sealed by its head assembly 12. The vessel has coolant flow inlet means 16 and coolant flow outlet means 14 formed integral with and through its cylindrical walls. As is known in the art, the vessel 10 contains a nuclear core of the type previously described, consisting mainly of a plurality of clad nuclear fuel elements which generate substantial amounts of heat, depending primarily upon the position of the control rods previously described. The heat generated by the reactor core is conveyed from the core by coolant flow entering through inlet means 16 and exiting through outlet means 14. Generally, the flow exiting through outlet means 14 is conveyed through an outlet conduit 26 to a heat exchange steam generator system 28, wherein the heated coolant flow is conveyed through tubes, schematically illustrated by reference character 18, which are in heat exchange relationship with water which is utilized to produce steam. The steam produced by the generator 28 is commonly utilized to drive a turbine 20 for the production of electricity. The flow of coolant is conveyed from the steam generator 28 by the pump 22 through a cool leg conduit 30 to the inlet means 16. Thus, a closed recycling primary or steam generating loop is provided with the coolant piping coupling the vessel 10 and the steam generator 28. The vessel shown in FIG. 1, is illustrated with one such closed fluid flow system or loop, although it should be understood that the number of such loops vary from plant to plant, and commonly two, three, or four are employed. Although not shown in the loop illustrated in FIG. 1, one loop of each plant includes a pressurizer which is responsive to the onset of a variation in pressure within the system due to temperature changes and variations in other operating conditions, to maintain a substantially constant primary pressure.

The secondary side of the steam generator is isolated from the primary coolant by the heat exchange tubes 18. In the steam generator the secondary fluid 34 is placed in heat exchange relationship with the primary coolant, where it is heated and converted to a vapor or steam. The vapors flows through a steam conduit 38, as denoted by the arrow 36, to a turbine 20 which is connected via shaft 24 to a load, for example, an electrical generator. The amount of steam exhausted to the turbine is controlled by a throttling valve 40. The steam, after passing through the turbine 20, is liquified in a condenser 42. The condensate or water thus formed is returned to the secondary or shell side of the steam generator through condensate pump 44, conduits 50, feedwater heater 46, and feedwater pump 48, as denoted by flow arrow 52. Thus, a recycling secondary electrical generating system is provided with the secondary fluid piping coupling the steam generator 28 to the turbine 20.

The coolant temperatures in the reactor outlet conduit 26 and the reactor inlet conduit 30 for each of the primary loops of a typical pressurized water reactor system such as the one illustrated in FIG. 1, are sensed by temperature measuring elements 54 and 56, respectively, each of which may comprise a thermocouple or temperature resistance bulb. The temperature measuring elements 54 and 56 produce output signals $T_1$ and $T_2$, respectively, representative of the instantaneous temperature at the measuring location. The $T_1$ and $T_2$ signals for each loop are applied to a temperature averaging unit, and the respective averages from the several loops are auctioneered to identify the highest instantaneous average operating temperature of the reactor. The identified operating temperature is then compared to a reference which is commonly a program function of the load. In a number of operating systems, when the instantaneous identified temperature of the reactor departs from the programmed reference, an error signal is generated which controls movement of the control rods in a direction to minimize the error. Such systems are said to employ a programmed average temperature, reactor following load mode of operation, such as is described in U.S. Pat. No. 3,423,285, to C. F. Currey et al.

Upon an increase in load demand, the plant operator opens the throttling valve 40 to the turbine 20 until the desired output is attained. The increased steam flow rate exhausted to the turbine lowers the secondary pressure and enhances heat removal from the primary coolant. The corresponding drop in primary coolant temperature that would otherwise occur is avoided through manipulation of the control rods 58 in response to the control signals obtained from the programmed average temperature control.

The program for the average temperature control is generated with consideration given to the physics design of the core, to avoid raising the core power level above acceptable limits. In addition, the axial power profile of the core is monitored by flux detectors 11 positioned exterior of the core, radially, equidistantly spaced 90 degrees apart around the reactor vessel's circumference. Abnormal asymmetries in the axial flux profile will trigger protective action so that local power peaks do not exceed acceptable limits. Dropped control rods may cause a similar asymmetry in the radial power distribution, which can also result in unacceptable power peaks. In accordance with the preferred embodiment of this invention set forth hereafter, reactor control is modified upon identification of a dropped control rod to maintain core operation at an acceptable level that will avoid unacceptable local power excursions.

Figure 2:
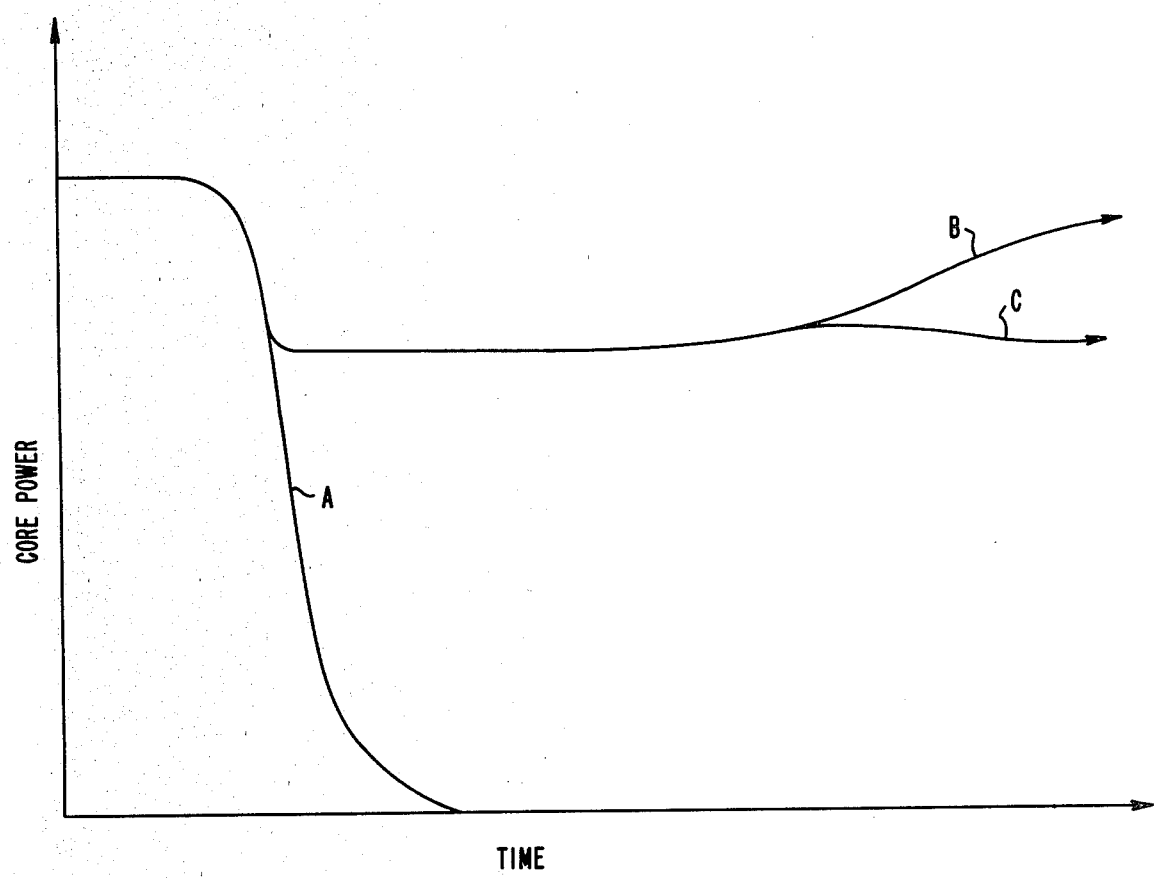
FIG. 2 is a graphical representation of core power plotted against time following a dropped control rod, for various reactor modes of operation.

FIG. 2 is a graphical plot of core power vs. time following a dropped control rod. Following a dropped control rod power in the reactor will normally decrease by an amount approximately equal to the neutron absorption worth of the dropped rod. This negative rate of change in reactivity is sufficient in some present systems to actuate safety systems which will respond to shut down the reactor, as identified by curve A. If no action were taken following a dropped control rod in a core having a negative coefficient of reactivity, the overall core reactivity level would increase tending to raise the core power to the level that existed prior to the dropped rod, as identified in curve B. To obtain an overall core power level equivalent to that existing prior to a rod drop, after a control rod drops, would mean that local core power levels spaced from the dropped rod exceed the power levels experienced prior to the dropped rod. Thus there is a potential for exceeding local power limits. A similar result to that illustrated by curve B will occur with a programmed average temperature control system upon automatic withdrawal of the control rods in response to a decrease in primary coolant temperature. However, continued sustained operation of the core can be safely maintained at the reduced power level achieved following the dropped control rod, identified by curve C, without violating local core power limits.

Accordingly, it is an object of this invention in its preferred embodiment to identify dropped control rods and safely sustain core operation at the reduced power level achieved following the rod drop.

Figure 3:
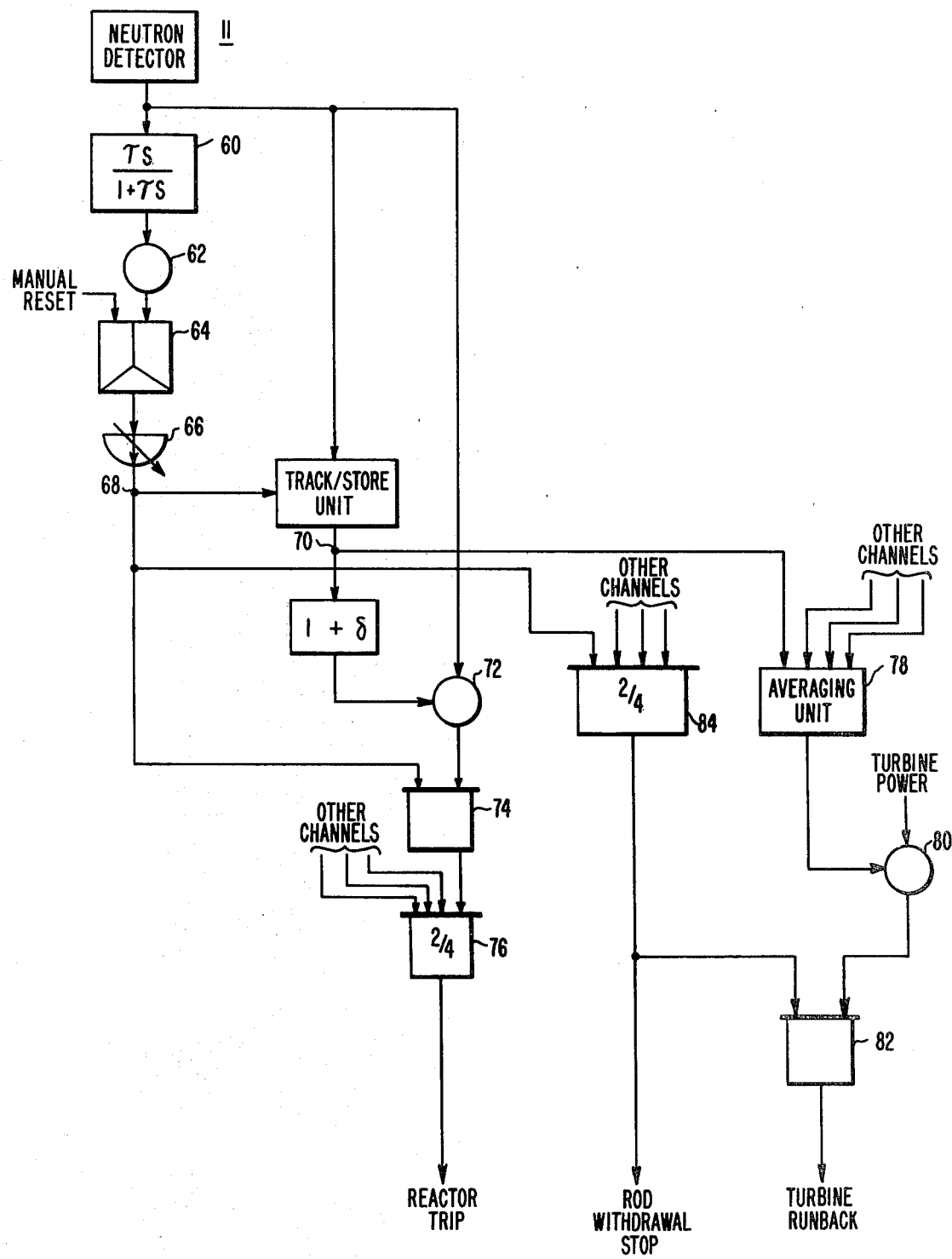
FIG. 3 is a schematic block circuitry illustration of the control system of one embodiment of this invention.

FIG. 3 illustrates a control circuit for carrying out the preferred embodiment of this invention. It should be appreciated that one such circuit is provided for each detector channel 11. Each of the neutron detectors 11 communicates an output to a corresponding dynamic rate-lag compensation circuit 16, well known in the art, which provides an output representative of the rate of change in neutron flux level identified by the detector 11. If the output of the dynamic rate-lag circuit is large enough in magnitude to exceed a preselected setpoint characteristic of a rod drop, then the negative rate bistable 62 will change state. The change of state of the bistable will be stored by a memory unit 64 and after a preestablished time delay 66 will be communicated to terminal 68. The memory 64 maintains the stored bistable output until reset manually. It should be appreciated that the setpoint of bistable 62 can be preselected to correspond to an appropriate value compatible with any particular reactor design. For example, in some reactors it may be desirable to adjust the setpoint to correspond to more than one dropped rod. The time delay 66 is provided to permit the reactor to reach a value of core power corresponding to a reduction in power approximately equal to the dropped control rod's neutron absorption worth. This time delay is usually equivalent to the time it takes the control rod to fully drop into the core, approximately 0.5 to 5 seconds, but desirably approximately 1 second.

The signal appearing at terminal 68 is provided as a control signal to a track/store device, well known in the art. The function of the track/store unit is to provide an output identical to its input when no control signal is present. When a control signal is present, however, the track/store unit maintains an output signal equal to its input at the time the control signal is applied. The input to the track/store unit is supplied from the neutron detector output so that the control signal 68 freezes the output of the track/store unit at a value corresponding to the flux of the core monitored after the power has been reduced by the neutron absorption worth of the dropped control rod. A small margin, δ, determined by analysis, and desirably as large as possible for operating latitude, but small enough so power peak limits are not exceeded, is added to the output of the track/store and used as an input to a variable setpoint bistable 72. The variable setpoint bistable also receives an input from the neutron detector 11, but does not provide an output unless the neutron detector signal exceeds the variable setpoint supplied by the track/store, with the margin added. If the nuclear power signal should return to a value above the setpoint supplied from the track/store, the bistable 72 will provide a trip signal to the reactor safety and protection logic. An output is required from both the bistable 72 and the memory 64 before a trip signal will be communicated by AND gate 74 to the 2/4 reactor safety and protection logic 76. The circuitry described is duplicated in the other protection channels and corresponding inputs are communicated to the 2/4 trip logic 76.

The output 70 from the track/store in each channel is communicated to an averaging unit 78. The output of the averaging unit forms a separate setpoint for a second variable setpoint bistable 80 which is used to monitor the turbine power. Should the turbine power exceed the setpoint imposed by the averaging unit 78, bistable 80 will provide an output to AND gate 82 which is connected to the controls for the turbine throttling valve 40, previously shown in FIG. 1. A second input to AND gate 82 is provided from the 2/4 logic module 84, which receives inputs from the corresponding terminals 68 in each of the four channels. If two out of the four channels indicate that the setpoints on the negative rate bistable 62 have been exceeded, and the turbine power exceeds the setpoint imposed by the averaging unit 78, the turbine will be throttled back to increase the steam pressure on the secondary side of the steam generator 28 and reduce the amount of heat removed from the primary side of the reactor. At the same time the output from the 2/4 logic module 84 prevents the control rods from being withdrawn further from the core, sustaining core operation at a reduced power level, without unnecessarily tripping the reactor.

During normal reactor operation the track/store unit will track the neutron detector output; however, the margin δ, added to the setpoint of bistable 72 and the lack of an affirmative signal output at terminal 68 will prevent the control system of this invention from adversely affecting reactor operation. Upon the occurrence of a negative rate signal in two out of the four channels sufficient to exceed the setpoint of bistable 62, further withdrawal of control rods will be inhibited, and the turbine will be monitored and run back, if necessary, to safely maintain reactor operation at a reduced power level. At the same time, the track/store will establish an appropriate setpoint for bistable 72 that will assure that reactor neutron flux levels compatible with continued operation at the reduced power level are not exceeded. If for some reason, the flux limits imposed by the bistables 72 in two out of the four channels are exceeded, the reactor will be tripped.

Thus, the system of this invention minimizes the number of avoidable reactor trips due to control rod drops that might otherwise occur with prior art systems and thereby improves plant availability. The design of this invention is adaptive in that it controls the setpoint for a reactor trip on neutron flux by perturbations in the neutron flux signal itself, which is a significant improvement over systems which establish setpoints from one or more other parameters other than the parameters to which the setpoint is being applied. Thus, the system of this invention is not as susceptible to changes in dependencies between parameters that can occur as a result of instrumentation drift, temperature changes and the like. Furthermore, the system of this invention increases the versatility of plant control by enabling the plant operator sufficient time to realign reactor control strategy to accommodate an adverse operating condition. Accordingly, this invention enables continued plant operation with a skewed radial power distribution without degrading the nuclear protection and safety systems.

I claim:

1. A nuclear reactor plant control system responsive to a given indication of a malfunctioning operating system affecting reactor core power output to automatically modify plant operation to permit sustained reactor operation with the malfunction, at a reduced power level within the design margin of the reactor system, comprising:

means for monitoring an operating parameter of the reactor indicative of core power output and providing a first representative electrical output;

means for identifying a given abnormal rate of change in the operating parameter indicative of the malfunction and providing a second corresponding electrical output;

means for identifying from the first and second outputs the core power output within a predetermined time of identifying the abnormal rate of change of the operating parameter; and means for modifying the operating conditions of the plant to maintain a sustained reactor core power output below the value identified from the first and second outputs plus a given margin.

2. The nuclear reactor plant control system of claim 1 wherein the reactor includes control mechanisms which are automatically responsive to changes in plant operating conditions to maintain the reactor at a programmed power level, including means for altering the automatic operation of the control mechanism in response to the second output to prevent the core power from exceeding the value identified from the first and second outputs plus the given margin.

3. The nuclear reactor control system of claim 1 wherein the means for identifying the abnormal rate of change in the operating parameter monitors the negative rate of change of the first electrical output.

4. The nuclear reactor control system of claim 1 wherein the reactor includes heat removal means and heat removal utilization means wherein the amount of heat removed from the reactor by the heat removal means is governed by the selected requirements of the utilization means, including means responsive to the second output to control the utilization means to maintain the heat removed from the reactor by the removal means below a level compatible with the core power level identified from the first and second outputs plus the given margin.

5. The nuclear reactor control system of claim 1 including means responsive to the first and second outputs to trip the reactor if the core power exceeds the power level identified by the first and second outputs plus the given margin.

6. The nuclear reactor control system of claim 1 wherein the operating parameter monitored is the neutron flux.

7. The nuclear reactor control system of claim 2 wherein the control mechanisms include control rods and the altering means alters the automatic operation of the control rods by blocking control rod withdrawal from the reactor core.

* * * * *